(12) United States Patent
Kim et al.

(10) Patent No.: US 10,657,584 B1
(45) Date of Patent: May 19, 2020

(54) METHOD AND DEVICE FOR GENERATING SAFE CLOTHING PATTERNS FOR RIDER OF BIKE

(71) Applicant: Stradvision, Inc., Pohang-si, Gyeongsangbuk-do (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang-si (KR)

( * ) Notice: Subject to any disclaimer, the term of this patent is extended or adjusted under 35 U.S.C. 154(b) by 0 days.

(21) Appl. No.: 16/740,085

(22) Filed: Jan. 10, 2020

Related U.S. Application Data (60) Provisional application No. 62/799,347, filed on Jan. 31, 2019.

(51) Int. Cl.
  *G06Q 30/06* (2012.01)
  *G06K 9/62* (2006.01)
  *G06T 7/11* (2017.01)

(52) U.S. Cl.
  CPC ....... *G06Q 30/0643* (2013.01); *G06K 9/6256* (2013.01); *G06T 7/11* (2017.01);
  (Continued)

(58) Field of Classification Search
  CPC .................. G06Q 30/0643; G06T 7/11; G06T 2207/20081; G06T 2207/30124; G06K 9/6256
  See application file for complete search history.

(56) References Cited

U.S. PATENT DOCUMENTS 6,188,777 B1 * 2/2001 Darrell ............... G06K 9/00362
  348/169
8,379,920 B2 * 2/2013 Yang .................. G06K 9/00369
  382/103
(Continued)

OTHER PUBLICATIONS

Bedeli et al. Clothing identification via deep learning: forensic applications, forensic sciences research, Jan. 31, 2018.*

*Primary Examiner* — John B Strege
(74) *Attorney, Agent, or Firm* — Kaplan Breyer Schwarz, LLP (57) ABSTRACT

A method for generating safe clothing patterns for a human-like figure is provided. The method includes steps of: a safe clothing-pattern generating device, (a) after acquiring an image of the human-like figure, generating a specific clothing pattern having an initial value, inputting the specific clothing pattern and the image of the human-like figure into a clothing composition network, combining the specific clothing pattern with a clothing of the human-like figure to generate a composite image; (b) inputting the composite image into an image translation network, translating surrounding environment on the composite image to generate a translated image, and inputting the translated image into an object detector to output detection information on the human-like figure; and (c) instructing a 1-st loss layer to calculate losses by referring to the detection information and a GT corresponding to the image of the human-like figure, and updating the initial value by using the losses.

14 Claims, 5 Drawing Sheets

(52) U.S. Cl.
CPC ............... *G06T 2207/20081* (2013.01); *G06T 2207/30124* (2013.01)

(56) References Cited

U.S. PATENT DOCUMENTS

| | | | |
|---|---|---|---|
| 9,892,296 B2* | 2/2018 | Kovarik | G06K 7/10376 |
| 10,460,199 B2* | 10/2019 | Carroll | G06F 16/60 |
| 2009/0287425 A1* | 11/2009 | Barten | A62B 99/00 |
| | | | 702/24 |
| 2013/0044944 A1* | 2/2013 | Wang | G06K 9/00369 |
| | | | 382/165 |
| 2016/0132705 A1* | 5/2016 | Kovarik | G06K 7/10376 |
| | | | 340/10.3 |
| 2018/0122033 A1* | 5/2018 | Mayuzumi | G06T 11/001 |
| 2019/0080457 A1* | 3/2019 | Shukla | G06T 7/521 |
| 2019/0096066 A1* | 3/2019 | Chen | G06T 7/136 |

\* cited by examiner

FIG. 5

METHOD AND DEVICE FOR GENERATING SAFE CLOTHING PATTERNS FOR RIDER OF BIKE

CROSS REFERENCE TO RELATED APPLICATION

This application claims the benefit of priority to U.S. Provisional Patent Application No. 62/799,347, filed on Jan. 31, 2019, the entire contents of which being incorporated herein by reference.

FIELD OF THE DISCLOSURE

The present disclosure relates to a method and a device for generating a safe clothing pattern to be used for a rider of a cycle; and more particularly, to the method and the device for generating the safe clothing pattern to be used for the rider, to thereby allow an object detector based on deep learning to easily detect the rider of the cycle.

BACKGROUND OF THE DISCLOSURE

In general, people who work on the road, for example, traffic police, cleaning operatives, and soldiers, most often work at night, so traffic accidents involving such night workers caused by vehicles occur frequently.

This is because the night workers are not visually separated and not easily perceived from their surrounding environment. Thus, light-reflecting material is attached to a vest so that the night workers are visually and perceptively discernible, for preventing the traffic accidents and protecting the night workers.

In addition, such a safety vest is worn by people who jog or hike at dawn or at night, so that they can exercise more safely from the dangers around them. That is, the wearer's location or presence may be known by wearing the safety vest at night or dawn.

However, such a reflective safety vest has a problem that it is not easily detected by an object detector based on deep learning using a camera or an autonomous vehicle using the object detector. That is, it is difficult for the object detector to detect the reflective safety vest if the object detector has not been learned using the training data including objects with the reflective safety vest, and it is also difficult to acquire sufficient training data including the objects with the reflective safety vest.

Therefore, the inventors of the present disclosure propose a method for generating a clothing pattern of the safety vest that is easy to detect by the object detector based on the deep learning.

SUMMARY OF THE DISCLOSURE

It is an object of the present disclosure to solve all the aforementioned problems.

It is another object of the present disclosure to provide a safety vest allowing a rider of a cycle, such as a bicycle or a motorcycle, to be easily detected by an object detector.

It is still another object of the present disclosure to generate a clothing pattern of the safety vest allowing the rider to be easily detected by the object detector.

In accordance with one aspect of the present disclosure, there is provided a method for generating one or more safe clothing patterns to be used for a human-like figure, including steps of: (a) if at least one image of the human-like figure is acquired, a safe clothing-pattern generating device performing a process of generating at least one specific clothing pattern having an initial value, and a process of inputting the specific clothing pattern and the image of the human-like figure into a clothing composition network, to thereby allow the clothing composition network to combine the specific clothing pattern with a clothing of the human-like figure on the image of the human-like figure, and thus to generate at least one composite image corresponding to the image of the human-like figure; (b) the safe clothing-pattern generating device performing a process of inputting the composite image into an image translation network, to thereby allow the image translation network to generate at least one translated image by translating a surrounding environment on the composite image, and a process of inputting the translated image into an object detector, to thereby allow the object detector to output detection information on the human-like figure representing the human-like figure detected in the translated image; and (c) the safe clothing-pattern generating device performing a process of instructing a 1-st loss layer to calculate one or more losses by referring to the detection information on the human-like figure and at least one GT corresponding to the image of the human-like figure, and a process of updating the initial value of the specific clothing pattern by using the losses such that the losses are minimized.

As one example, at the step of (a), the safe clothing-pattern generating device performs a process of inputting the image of the human-like figure and the specific clothing pattern into the clothing composition network, to thereby allow the clothing composition network to perform (i) a process of segmenting the clothing on the image of the human-like figure via a segmentation network and a process of acquiring one or more joint parts of the human-like figure on the image of the human-like figure via a posture estimation network, (ii) a process of acquiring at least one masked image created by masking the clothing with the specific clothing pattern by referring to the joint parts via a masking layer, (iii) a process of generating at least one concatenated image by concatenating the masked image and the image of the human-like figure, and (iv) a process of applying at least one convolution operation to the concatenated image via an encoder and a process of applying at least one deconvolution operation to an output of the encoder via a decoder, to thereby generate the composite image.

As one example, the clothing composition network has been learned by a learning device to generate the composite image using the specific clothing pattern and the image of the human-like figure, and wherein the learning device has learned the clothing composition network by repeating (i) a process of inputting at least one acquired training image of the human-like figure into the segmentation network, to thereby allow the segmentation network to segment at least one clothing for training on the training image of the human-like figure and a process of inputting the training image of the human-like figure into the posture estimation network, to thereby allow the posture estimation network to acquire one or more joint parts for training of at least one human-like figure for training on the training image of the human-like figure, (ii) a process of inputting the joint parts for training, the clothing for training, and at least one acquired clothing pattern for training into the masking layer, to thereby allow the masking layer to generate at least one masked image for training created by masking the clothing for training with the clothing pattern for training by referring to the joint parts for training, (iii) a process of generating at least one concatenated image for training by concatenating the masked image for training and the training image of the human-like figure, (iv) a process of inputting the concatenated image for training into the encoder, to thereby allow the encoder to apply said at least one convolution operation to the concatenated image for training and a process of inputting the output of the encoder into the decoder, to thereby allow the decoder to apply at least one deconvolution operation to the output of the encoder and thus to generate the composite image for training and (v) a process of instructing a 2-nd loss layer to calculate one or more perceptual losses by referring to (v-1) the composite image for training and (v-2) at least one GT image created as corresponding to the training image of the human-like figure and the clothing pattern for training and a process of adjusting at least one parameter of the decoder, the encoder, and the masking layer via backpropagation by referring to the perceptual losses such that the perceptual losses are minimized.

As one example, the GT image is generated by masking the clothing for training on the training image of the human-like figure with the clothing pattern for training.

As one example, the GT is one of (i) information corresponding to the human-like figure created by labeling the image of the human-like figure, and (ii) information corresponding to the human-like figure which is detected from the image of the human-like figure inputted into the object detector or another object detector.

As one example, at the step of (b), the safe clothing-pattern generating device performs a process of instructing the image translation network to translate the surrounding environment on the composite image into another surrounding environment such that a performance of a conventional object detector for detecting the human-like figure becomes lower than a preset threshold.

As one example, the image translation network includes a CycleGAN (Generative Adversarial Network) capable of image-to-image translation of original images and translated images, which are unpaired with each other, respectively belonging to different domains.

In accordance with another aspect of the present disclosure, there is provided a safe clothing-pattern generating device for generating one or more safe clothing patterns to be used for a human-like figure, including: at least one memory that stores instructions; and at least one processor configured to execute the instructions to perform or support another device to perform: (I) if at least one image of the human-like figure is acquired, a process of generating at least one specific clothing pattern having an initial value, and a process of inputting the specific clothing pattern and the image of the human-like figure into a clothing composition network, to thereby allow the clothing composition network to combine the specific clothing pattern with a clothing of the human-like figure on the image of the human-like figure, and thus to generate at least one composite image corresponding to the image of the human-like figure, (II) a process of inputting the composite image into an image translation network, to thereby allow the image translation network to generate at least one translated image by translating a surrounding environment on the composite image, and a process of inputting the translated image into an object detector, to thereby allow the object detector to output detection information on the human-like figure representing the human-like figure detected in the translated image, and (III) a process of instructing a 1-st loss layer to calculate one or more losses by referring to the detection information on the human-like figure and at least one GT corresponding to the image of the human-like figure, and a process of updating the initial value of the specific clothing pattern by using the losses such that the losses are minimized.

As one example, at the process of (I), the processor performs a process of inputting the image of the human-like figure and the specific clothing pattern into the clothing composition network, to thereby allow the clothing composition network to perform (i) a process of segmenting the clothing on the image of the human-like figure via a segmentation network and a process of acquiring one or more joint parts of the human-like figure on the image of the human-like figure via a posture estimation network, (ii) a process of acquiring at least one masked image created by masking the clothing with the specific clothing pattern by referring to the joint parts via a masking layer, (iii) a process of generating at least one concatenated image by concatenating the masked image and the image of the human-like figure, and (iv) a process of applying at least one convolution operation to the concatenated image via an encoder and a process of applying at least one deconvolution operation to an output of the encoder via a decoder, to thereby generate the composite image.

As one example, the clothing composition network has been learned by a learning device to generate the composite image using the specific clothing pattern and the image of the human-like figure, and wherein the learning device has learned the clothing composition network by repeating (i) a process of inputting at least one acquired training image of the human-like figure into the segmentation network, to thereby allow the segmentation network to segment at least one clothing for training on the training image of the human-like figure and a process of inputting the training image of the human-like figure into the posture estimation network, to thereby allow the posture estimation network to acquire one or more joint parts for training of at least one human-like figure for training on the training image of the human-like figure, (ii) a process of inputting the joint parts for training, the clothing for training, and at least one acquired clothing pattern for training into the masking layer, to thereby allow the masking layer to generate at least one masked image for training created by masking the clothing for training with the clothing pattern for training by referring to the joint parts for training, (iii) a process of generating at least one concatenated image for training by concatenating the masked image for training and the training image of the human-like figure, (iv) a process of inputting the concatenated image for training into the encoder, to thereby allow the encoder to apply said at least one convolution operation to the concatenated image for training and a process of inputting the output of the encoder into the decoder, to thereby allow the decoder to apply at least one deconvolution operation to the output of the encoder and thus to generate the composite image for training and (v) a process of instructing a 2-nd loss layer to calculate one or more perceptual losses by referring to (v-1) the composite image for training and (v-2) at least one GT image created as corresponding to the training image of the human-like figure and the clothing pattern for training and a process of adjusting at least one parameter of the decoder, the encoder, and the masking layer via backpropagation by referring to the perceptual losses such that the perceptual losses are minimized.

As one example, the GT image is generated by masking the clothing for training on the training image of the human-like figure with the clothing pattern for training.

As one example, the GT is one of (i) information corresponding to the human-like figure created by labeling the image of the human-like figure, and (ii) information corresponding to the human-like figure which is detected from the image of the human-like figure inputted into the object detector or another object detector.

As one example, at the process of (II), the processor performs a process of instructing the image translation network to translate the surrounding environment on the composite image into another surrounding environment such that a performance of a conventional object detector for detecting the human-like figure becomes lower than a preset threshold.

As one example, the image translation network includes a CycleGAN (Generative Adversarial Network) capable of image-to-image translation of original images and translated images, which are unpaired with each other, respectively belonging to different domains.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

As used in this specification and the appended claims, the singular forms "a," "an," and "the" include plural referents unless the content and context clearly dictates otherwise.

Also, the description below takes an example of a rider of a cycle, but the scope of the present disclosure is not limited thereto, and the present disclosure may be applicable to any human-like figures such as pedestrians, mannequins dressed as police officers or construction workers, etc., any animals, or any vehicles. For example, in case of a vehicle, a specific pattern may be wrapped around sides or a rear of the vehicle for higher detectability in a specific surrounding environment, bypassing below processes related to determination of joint parts.

To allow those skilled in the art to carry out the present disclosure easily, the example embodiments of the present disclosure by referring to attached diagrams will be explained in detail as shown below.

Figure 1:
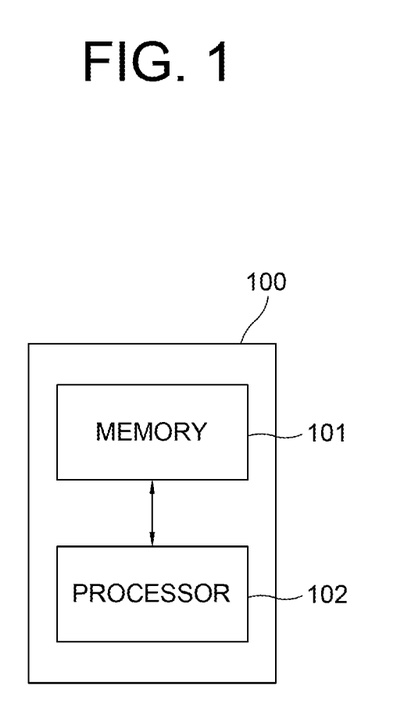
FIG. 1 is a drawing schematically illustrating a safe clothing-pattern generating device for generating a safe clothing pattern to be used for a rider of a cycle in accordance with one example embodiment of the present disclosure.

FIG. 1 is a drawing schematically illustrating a safe clothing-pattern generating device for generating at least one safe clothing pattern to be used for the rider of the cycle in accordance with one example embodiment of the present disclosure. By referring to FIG. 1, the safe clothing-pattern generating device 100 may include a memory 101 for storing instructions to generate the safe clothing pattern to be used for the rider of the cycle and a processor 102 for performing processes corresponding to the instructions in the memory 101 to generate the safe clothing pattern to be used for the rider of the cycle. Throughout the present disclosure, the cycle may include a unicycle, a bicycle, a tricycle, a two-wheeled motorcycle, a one-wheeled or three-wheeled motor vehicle, etc., but the scope of the present disclosure is not limited thereto.

Specifically, the safe clothing-pattern generating device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

Figure 2:
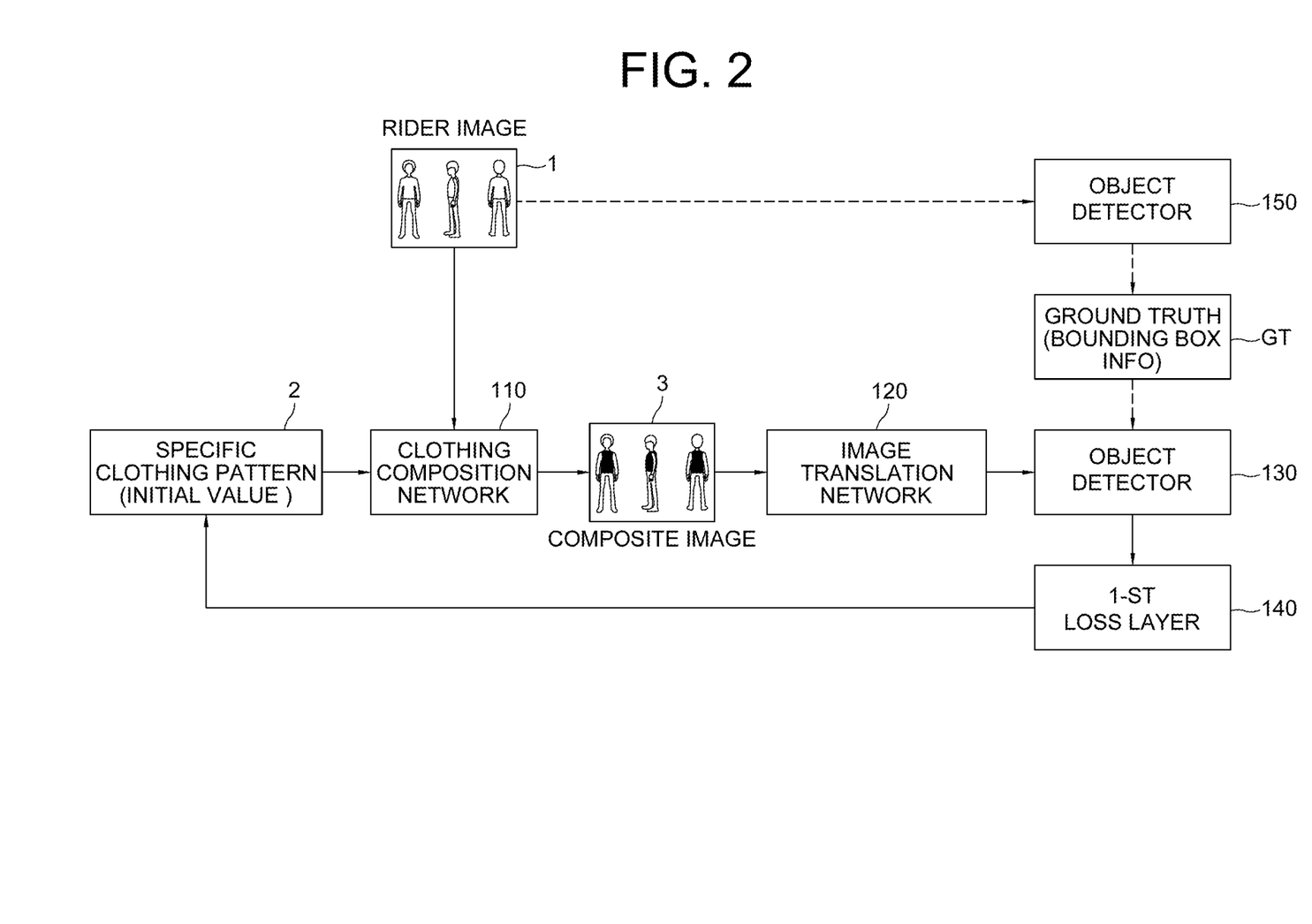
FIG. 2 is a drawing schematically illustrating a method for generating the safe clothing pattern to be used for the rider of the cycle in accordance with one example embodiment of the present disclosure.

A method for generating the safe clothing pattern to be used for the rider by using the safe clothing-pattern generating device 100 in accordance with one example embodiment of the present disclosure is described by referring to FIG. 2 as follows.

First, if at least one rider image 1 corresponding to the rider of the cycle or the rider intending to ride the cycle is acquired, the safe clothing-pattern generating device 100 may generate at least one specific clothing pattern 2 having an initial value. Herein, the initial value may include pixel values in the clothing pattern at an initial stage, but the scope of the present disclosure is not limited thereto. Herein, the safe clothing-pattern generating device 100 may generate the specific clothing pattern 2 by random sampling or may retrieve the specific clothing pattern 2 from a database storing various clothing patterns. Further, the human-like figure may be an image of a real human, but the present disclosure is not limited thereto, and may be a human-like mannequin, for example. In addition, although the present disclosure is described using a "rider image" as an image of a human riding a motorcycle and etc., however, it is only for convenience of explanation. That is, the present disclosure may be applicable if it is not related to the rider image per se. For example, an image of a human-like figure who does not ride a motorcycle and the like, e.g., a cleaning operative or a mannequin on the road, can be used instead of the rider image.

Next, the safe clothing-pattern generating device 100 may perform a process of inputting the rider image 1 and the specific clothing pattern 2 into a clothing composition network 110, to thereby allow the clothing composition network 110 to combine the specific clothing pattern 2 with a rider clothing of the rider on the rider image 1, and thus to generate at least one composite image 3 corresponding to the rider image 1. Herein, the composite image 3 may be generated such that the rider is seen wearing a clothing having the specific clothing pattern or that the rider is seen additionally wearing a specific clothing having the specific clothing pattern over his/her clothing.

Figure 3:
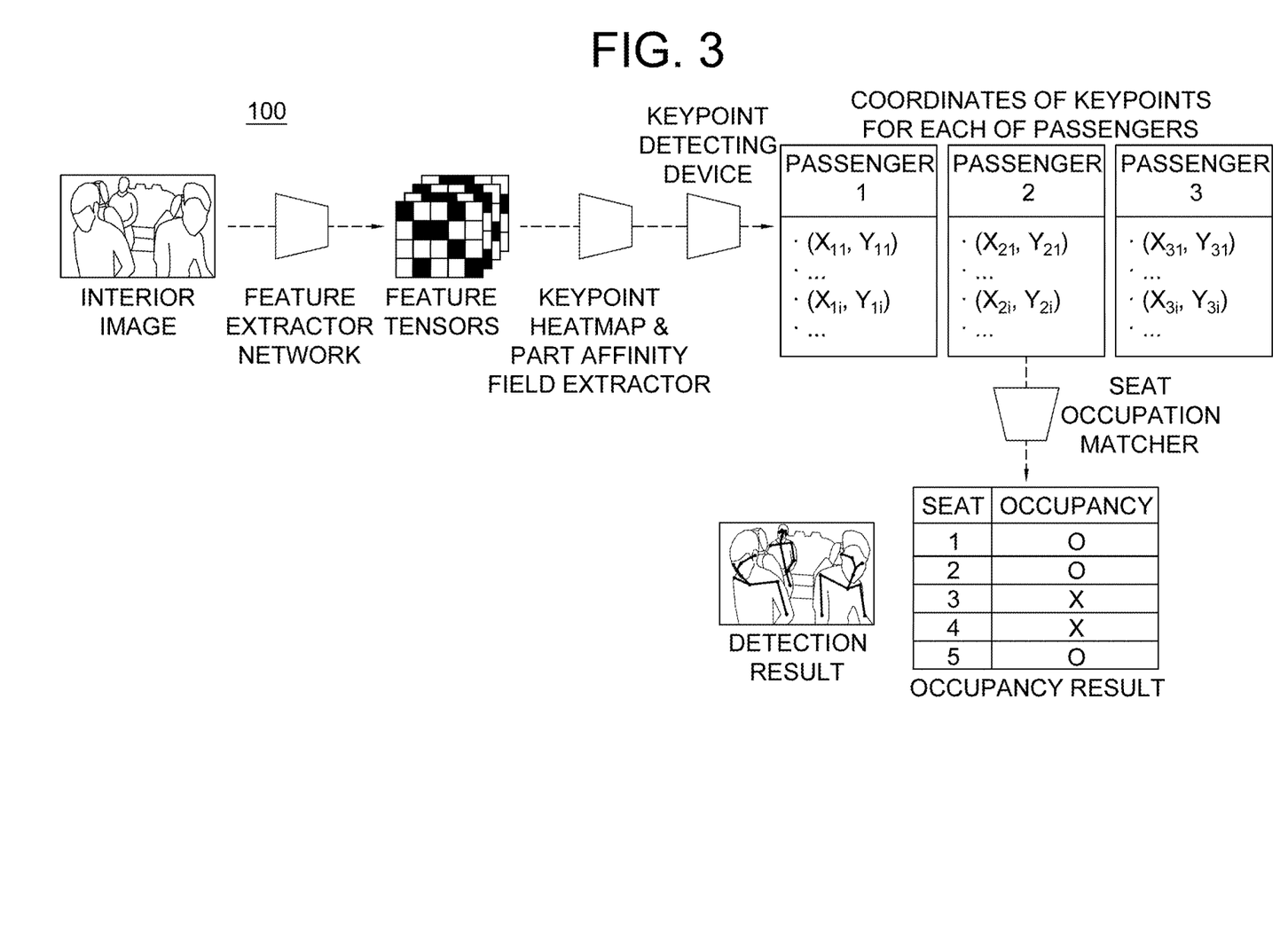
FIG. 3 is a drawing schematically illustrating a process of a clothing composition network combining a specific clothing pattern with a rider image in the method for generating the safe clothing pattern to be used for the rider in accordance with one example embodiment of the present disclosure.

Meanwhile, a process of the clothing composition network 110 generating the composite image 3 by combining the specific clothing pattern 2 with the rider image 1 is described in detail by referring to FIG. 3 as follows.

The clothing composition network 110 may perform a process of inputting the rider image 1 into a segmentation network 111, to thereby allow the segmentation network 111 to segment the rider clothing on the rider image 1, and a process of inputting the rider image 1 into a posture estimation network 112, to thereby allow the posture estimation network 112 to acquire one or more joint parts of the rider on the rider image.

Herein, the segmentation network 111 may include at least one convolutional layer and its corresponding at least one deconvolutional layer, and may instruct the at least one convolutional layer to apply at least one convolution operation to the rider image 1, and may instruct the at least one deconvolutional layer to apply as many deconvolution operations as the at least one convolution operation to an output of a last convolutional layer, to thereby segment the rider image 1 and thus to extract the rider clothing from the rider image 1.

Also, the posture estimation network 112 may include at least one convolutional layer and at least one fully convolutional layer, and may instruct the at least one convolutional layer to apply at least one convolution operation to the rider image 1, to thereby generate at least one feature map, and may instruct the at least one fully convolutional layer to apply at least one 1×1 convolution operation to the feature map outputted from the last convolutional layer, to thereby generate each of one or more estimated posture images of each of the joint parts, e.g., shoulders, elbows, wrists, a pelvis, etc. of the rider. Herein, in the estimated posture images, a location where a joint of the rider is estimated as located may be indicated as 1, and a location where the joint is estimated as not located may be indicated as 0, and each channel of the estimated posture images may correspond to each of the joint parts.

Thereafter, the clothing composition network 110 may acquire at least one masked image by masking the rider clothing with the specific clothing pattern 2 by referring to the joint parts via a masking layer 113. That is, the clothing composition network 110 may input the segmented rider clothing image, the estimated posture images with the indicated joint parts, and the specific clothing pattern 2 into the masking layer 113, to thereby allow the masking layer 113 to mask the rider clothing with the specific clothing pattern 2 by referring to the joint parts. Herein, a shape of the specific clothing pattern 2 may change according to the joint parts, and the clothing pattern matching a current pose of the rider may be generated by masking the rider clothing with the specific clothing pattern 2 by referring to the joint parts.

And, the clothing composition network 110 may perform (i) a process of generating at least one concatenated image by concatenating the masked image and the rider image 1, (ii) a process of applying at least one convolution operation to the concatenated image via an encoder 114 including at least one convolutional layer, and (iii) a process of applying at least one deconvolution operation to an output of the encoder 114 via the encoder 115 including at least one deconvolutional layer, to thereby generate the composite image 3.

Herein, the clothing composition network 100 may have been learned by a learning device to generate the composite image using the specific clothing pattern and the rider image.

Figure 4:
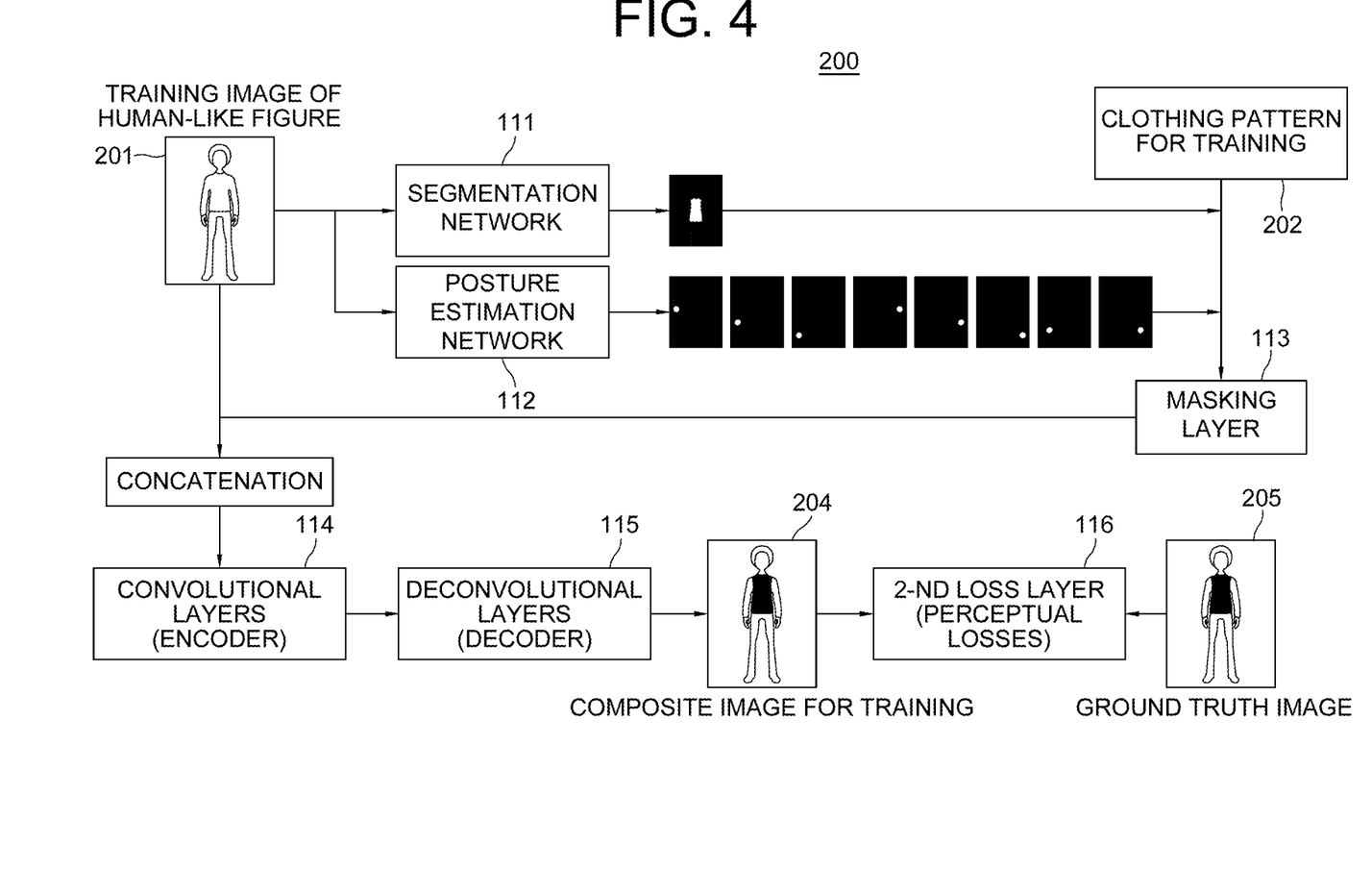
FIG. 4 is a drawing schematically illustrating a process of learning the clothing composition network in the method for generating the safe clothing pattern to be used for the rider in accordance with one example embodiment of the present disclosure.

As one example, by referring to FIG. 4, the learning device 200 may acquire training data to be used for learning the clothing composition network 110. Herein, the training data may include at least one rider image for training 201 corresponding to the rider, at least one clothing pattern for training 202, and at least one GT image 205 corresponding to the rider wearing a clothing combined with the clothing pattern for training 202. And, the GT image 205 may be generated by masking the rider clothing for training on the rider image for training 201 with the clothing pattern for training 202.

And, the learning device 200 may perform a process of inputting the rider image for training 201 into the segmentation network 111, to thereby allow the segmentation network 111 to segment the rider clothing for training on the rider image for training 201, and a process of inputting the rider image for training 201 into the posture estimation network 112, to thereby allow the posture estimation network 112 to acquire one or more joint parts for training of a rider for training on the rider image for training 201.

Thereafter, the learning device 200 may input the joint parts for training, the rider clothing for training, and the clothing pattern for training 202 into the masking layer 113, to thereby allow the masking layer 113 to mask the rider clothing for training with the clothing pattern for training 202 by referring to the joint parts for training.

And, the learning device 200 may perform (i) a process of generating at least one concatenated image for training by concatenating at least one masked image for training and the rider image for training 201, (ii) a process of inputting the concatenated image for training into the encoder 114, to thereby allow the encoder 114 to apply at least one convolution operation to the concatenated image for training and (iii) a process of inputting at least one output of the encoder 114 into the decoder 115, to thereby allow the decoder 115 to apply at least one deconvolution operation to the output of the encoder 114, to thereby generate the composite image for training 204.

Thereafter, the learning device 200 may learn the clothing composition network 110 by repeating (i) a process of instructing a 2-nd loss layer 116 to calculate one or more perceptual losses by referring to (i–1) the composite image for training and (i–2) the GT image, and (ii) a process of adjusting at least one parameter of the decoder, the encoder, and the masking layer via backpropagation by referring to the perceptual losses such that the perceptual losses are minimized. A 1-st loss layer 140 will be described later.

Herein, as can be seen in pp 694-711 of a research paper "Perceptual Losses for Real-Time Style Transfer and Super-Resolution", Computer Vision—ECCV 2016, 14th European Conference, Amsterdam, The Netherlands, Oct. 11-14, 2016, Proceedings, Part II, and "Photo-Realistic Single Image Super-Resolution Using a Generative Adversarial network", CVPR. Vol. 2. No. 3. 2017., etc., the perceptual losses may be losses using a perceptual similarity instead of pixel-wise losses (MSE: Mean Squared Error).

Next, by referring to FIG. 2 again, the safe clothing-pattern generating device 100 may perform a process of inputting the composite image 3 into an image translation network 120, to thereby allow the image translation network 120 to generate at least one translated image by translating a surrounding environment on the composite image 3.

Herein, the translated image may be an image created by translating the surrounding environment on the composite image 3, into another surrounding environment such as nighttime, snow, rain, etc., and said another surrounding environment may be an environment capable of allowing the object detector to detect a rider wearing the clothing with the specific clothing pattern more easily than a rider not wearing the clothing with the specific clothing pattern. That is, the translated image may be created by translating the surrounding environment on the composite image 3 into another surrounding environment such that a performance of a conventional object detector for detecting the rider originally on the rider image 1 becomes lower than a preset threshold.

And, the image translation network 120 may include a CycleGAN (Generative Adversarial Network) capable of image-to-image translation of original images and translated images, which are unpaired with each other, respectively belonging to different domains.

Herein, as can be seen in a research paper "Unpaired Image-to-Image Translation using Cycle-Consistent Adversarial Networks" ICCV 2017, the CycleGAN may allow an original image to be translated to another domain and restored back as the original image using an adversarial loss and a cycle-consistency loss.

Meanwhile, the present disclosure may use an adversarial attack of the CycleGAN to degrade the composite image by backpropagating a positive gradient to the composite image such that the loss is increased, to thereby generate the translated image.

Next, the safe clothing-pattern generating device 100 may perform a process of inputting the translated image into the object detector 130, to thereby allow the object detector 130 to output rider detection information representing the rider detected from the translated image.

Figure 5:
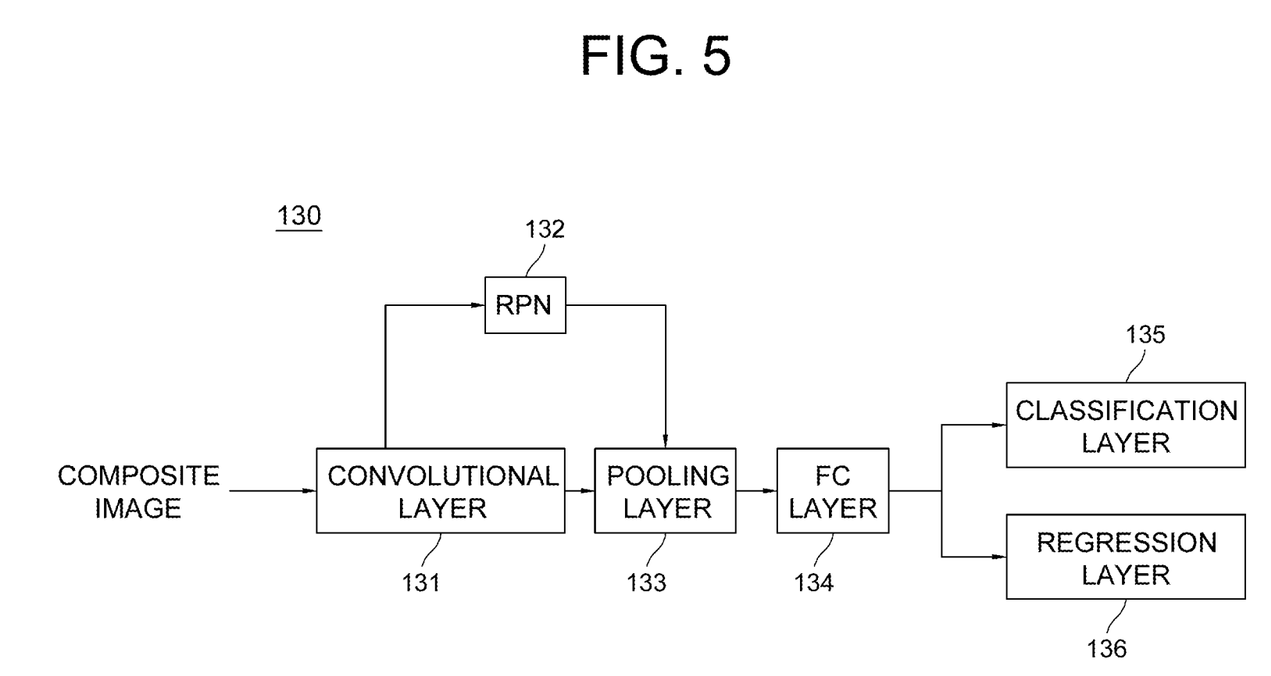
FIG. 5 is a drawing schematically illustrating a process of an object detector detecting the rider on a composite image in the method for generating the safe clothing pattern to be used for the rider in accordance with one example embodiment of the present disclosure.

As one example, by referring to FIG. 5, the object detector 130 may input the composite image into at least one convolutional layer 131, to thereby allow the convolutional layer 131 to apply its at least one convolution operation to the composite image and thus to generate at least one feature map. And, the object detector 130 may input the feature map into a region proposal network 132, to thereby allow the region proposal network 132 to output one or more proposal boxes corresponding to one or more objects on the feature map. Thereafter, the object detector 130 may input the feature map into a pooling layer 133, to thereby allow the pooling layer 133 to output at least one feature vector by applying its pooling operation to one or more regions, corresponding to the proposal boxes, on the feature map. And, the object detector 130 may input the feature vector into a fully connected layer 134, to thereby allow the fully connected layer 134 to apply its fully-connected operation to the feature vector, and may input at least one output of the fully connected layer 134 respectively into a classification layer 135 and a regression layer 136, to thereby allow the classification layer 135 and the regression layer 136 to respectively generate class information and regression information on each of the objects corresponding to each of the proposal boxes, and as a result, may detect the objects on the composite image, that is, the rider on the composite image, to thereby output object information corresponding to the rider. Herein, the object information may include the class information and bounding box information.

Next, the safe clothing-pattern generating device 100 may instruct the 1-st loss layer 140 to calculate one or more losses by referring to the object information, corresponding to the detected rider, i.e., the rider wearing the clothing combined with the specific clothing pattern, and its corresponding GT, to thereby adjust the initial value, for example, a gradient of the specific clothing pattern, by backpropagating the calculated losses such that the losses are minimized. Herein, the losses calculated by referring to the GT corresponding to the rider image 1 may be feature losses, and may be different from the perceptual losses calculated by referring to the GT image described using FIG. 4.

Also, the safe clothing-pattern generating device 100 may perform a negative gradient method such that the losses are decreased by backpropagation.

Meanwhile, in the above description, the GT corresponding to the rider image 1, that is, the GT including the class information and the regression information corresponding to the rider created by labeling the rider image 1, is used, however, if the GT created by labeling the rider image 1 is unavailable, a separate process for generating the GT may be performed.

That is, the safe clothing-pattern generating device 100 may instruct an object detector 150 to detect the rider on the rider image 1, to thereby output the object information corresponding to the rider, and may set object detection information, i.e., information corresponding to the rider, outputted from the object detector 150, as the GT.

Herein, the object detector 150 may be the object detector 130 or may be another object detector different from the object detector 130.

By repeating the processes above, the clothing pattern allowing the object detector to easily detect the objects in the surrounding environment such as nighttime, snow, rain, etc. may be generated, and as a result, the objects may be detected without regard to degrading factors, such as nighttime, snow, rain, etc., of an image or a feature. As above, on condition that the specific clothing pattern has been generated and that surrounding environment, causing degradation of an image or a feature, has been added via a generative adversarial network, on the image with the specific clothing pattern, the present disclosure allows a detection score of the rider by an object detection network to be increased, to thereby provide clothing patterns robust against adversarial attacks which cause the degradation of an image or a feature, such as nighttime, snow, rain, etc.

The present disclosure has an effect of providing a safety vest which allows the rider to be easily detected by the object detector, to thereby decrease risk of accidents.

The present disclosure has another effect of generating the clothing pattern of the safety vest allowing the rider to be easily detected by the object detector, to thereby allow the object detector to easily detect the rider without regard to the surrounding environment.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for generating one or more safe clothing patterns to be used for a human-like figure, comprising steps of:
    (a) if at least one image of the human-like figure is acquired, a safe clothing-pattern generating device performing a process of generating at least one specific clothing pattern having an initial value, and a process of inputting the specific clothing pattern and the image of the human-like figure into a clothing composition network, to thereby allow the clothing composition network to combine the specific clothing pattern with a clothing of the human-like figure on the image of the human-like figure, and thus to generate at least one composite image corresponding to the image of the human-like figure;
    (b) the safe clothing-pattern generating device performing a process of inputting the composite image into an image translation network, to thereby allow the image translation network to generate at least one translated image by translating a surrounding environment on the composite image, and a process of inputting the translated image into an object detector, to thereby allow the object detector to output detection information on the human-like figure representing the human-like figure detected in the translated image; and
    (c) the safe clothing-pattern generating device performing a process of instructing a 1-st loss layer to calculate one or more losses by referring to the detection information on the human-like figure and at least one GT corresponding to the image of the human-like figure, and a process of updating the initial value of the specific clothing pattern by using the losses such that the losses are minimized.

2. The method of claim 1, wherein, at the step of (a), the safe clothing-pattern generating device performs a process of inputting the image of the human-like figure and the specific clothing pattern into the clothing composition network, to thereby allow the clothing composition network to perform (i) a process of segmenting the clothing on the image of the human-like figure via a segmentation network and a process of acquiring one or more joint parts of the human-like figure on the image of the human-like figure via a posture estimation network, (ii) a process of acquiring at least one masked image created by masking the clothing with the specific clothing pattern by referring to the joint parts via a masking layer, (iii) a process of generating at least one concatenated image by concatenating the masked image and the image of the human-like figure, and (iv) a process of applying at least one convolution operation to the concatenated image via an encoder and a process of applying at least one deconvolution operation to an output of the encoder via a decoder, to thereby generate the composite image.

3. The method of claim 2, wherein the clothing composition network has been learned by a learning device to generate the composite image using the specific clothing pattern and the image of the human-like figure, and wherein the learning device has learned the clothing composition network by repeating (i) a process of inputting at least one acquired training image of the human-like figure into the segmentation network, to thereby allow the segmentation network to segment at least one clothing for training on the training image of the human-like figure and a process of inputting the training image of the human-like figure into the posture estimation network, to thereby allow the posture estimation network to acquire one or more joint parts for training of at least one human-like figure for training on the training image of the human-like figure, (ii) a process of inputting the joint parts for training, the clothing for training, and at least one acquired clothing pattern for training into the masking layer, to thereby allow the masking layer to generate at least one masked image for training created by masking the clothing for training with the clothing pattern for training by referring to the joint parts for training, (iii) a process of generating at least one concatenated image for training by concatenating the masked image for training and the training image of the human-like figure, (iv) a process of inputting the concatenated image for training into the encoder, to thereby allow the encoder to apply said at least one convolution operation to the concatenated image for training and a process of inputting the output of the encoder into the decoder, to thereby allow the decoder to apply at least one deconvolution operation to the output of the encoder and thus to generate the composite image for training and (v) a process of instructing a 2-nd loss layer to calculate one or more perceptual losses by referring to (v-1) the composite image for training and (v-2) at least one GT image created as corresponding to the training image of the human-like figure and the clothing pattern for training and a process of adjusting at least one parameter of the decoder, the encoder, and the masking layer via backpropagation by referring to the perceptual losses such that the perceptual losses are minimized.

4. The method of claim 3, wherein the GT image is generated by masking the clothing for training on the training image of the human-like figure with the clothing pattern for training.

5. The method of claim 1, wherein the GT is one of (i) information corresponding to the human-like figure created by labeling the image of the human-like figure, and (ii) information corresponding to the human-like figure which is detected from the image of the human-like figure inputted into the object detector or another object detector.

6. The method of claim 1, wherein, at the step of (b), the safe clothing-pattern generating device performs a process of instructing the image translation network to translate the surrounding environment on the composite image into another surrounding environment such that a performance of a conventional object detector for detecting the human-like figure becomes lower than a preset threshold.

7. The method of claim 6, wherein the image translation network includes a CycleGAN (Generative Adversarial Network) capable of image-to-image translation of original images and translated images, which are unpaired with each other, respectively belonging to different domains.

8. A safe clothing-pattern generating device for generating one or more safe clothing patterns to be used for a human-like figure, comprising:

at least one memory that stores instructions; and at least one processor configured to execute the instructions to perform or support another device to perform: (I) if at least one image of the human-like figure is acquired, a process of generating at least one specific clothing pattern having an initial value, and a process of inputting the specific clothing pattern and the image of the human-like figure into a clothing composition network, to thereby allow the clothing composition network to combine the specific clothing pattern with a clothing of the human-like figure on the image of the human-like figure, and thus to generate at least one composite image corresponding to the image of the human-like figure, (II) a process of inputting the composite image into an image translation network, to thereby allow the image translation network to generate at least one translated image by translating a surrounding environment on the composite image, and a process of inputting the translated image into an object detector, to thereby allow the object detector to output detection information on the human-like figure representing the human-like figure detected in the translated image, and (III) a process of instructing a 1-st loss layer to calculate one or more losses by referring to the detection information on the human-like figure and at least one GT corresponding to the image of the human-like figure, and a process of updating the initial value of the specific clothing pattern by using the losses such that the losses are minimized.

9. The safe clothing-pattern generating device of claim 8, wherein, at the process of (I), the processor performs a process of inputting the image of the human-like figure and the specific clothing pattern into the clothing composition network, to thereby allow the clothing composition network to perform (i) a process of segmenting the clothing on the image of the human-like figure via a segmentation network and a process of acquiring one or more joint parts of the human-like figure on the image of the human-like figure via a posture estimation network, (ii) a process of acquiring at least one masked image created by masking the clothing with the specific clothing pattern by referring to the joint parts via a masking layer, (iii) a process of generating at least one concatenated image by concatenating the masked image and the image of the human-like figure, and (iv) a process of applying at least one convolution operation to the concatenated image via an encoder and a process of applying at least one deconvolution operation to an output of the encoder via a decoder, to thereby generate the composite image.

10. The safe clothing-pattern generating device of claim 9, wherein the clothing composition network has been learned by a learning device to generate the composite image using the specific clothing pattern and the image of the human-like figure, and wherein the learning device has learned the clothing composition network by repeating (i) a process of inputting at least one acquired training image of the human-like figure into the segmentation network, to thereby allow the segmentation network to segment at least one clothing for training on the training image of the human-like figure and a process of inputting the training image of the human-like figure into the posture estimation network, to thereby allow the posture estimation network to acquire one or more joint parts for training of at least one human-like figure for training on the training image of the human-like figure, (ii) a process of inputting the joint parts for training, the clothing for training, and at least one acquired clothing pattern for training into the masking layer, to thereby allow the masking layer to generate at least one masked image for training created by masking the clothing for training with the clothing pattern for training by referring to the joint parts for training, (iii) a process of generating at least one concatenated image for training by concatenating the masked image for training and the training image of the human-like figure, (iv) a process of inputting the concatenated image for training into the encoder, to thereby allow the encoder to apply said at least one convolution operation to the concatenated image for training and a process of inputting the output of the encoder into the decoder, to thereby allow the decoder to apply at least one deconvolution operation to the output of the encoder and thus to generate the composite image for training and (v) a process of instructing a 2-nd loss layer to calculate one or more perceptual losses by referring to (v-1) the composite image for training and (v-2) at least one GT image created as corresponding to the training image of the human-like figure and the clothing pattern for training and a process of adjusting at least one parameter of the decoder, the encoder, and the masking layer via back-propagation by referring to the perceptual losses such that the perceptual losses are minimized.

11. The safe clothing-pattern generating device of claim 10, wherein the GT image is generated by masking the clothing for training on the training image of the human-like figure with the clothing pattern for training.

12. The safe clothing-pattern generating device of claim 8, wherein the GT is one of (i) information corresponding to the human-like figure created by labeling the image of the human-like figure, and (ii) information corresponding to the human-like figure which is detected from the image of the human-like figure inputted into the object detector or another object detector.

13. The safe clothing-pattern generating device of claim 8, wherein, at the process of (II), the processor performs a process of instructing the image translation network to translate the surrounding environment on the composite image into another surrounding environment such that a performance of a conventional object detector for detecting the human-like figure becomes lower than a preset threshold.

14. The safe clothing-pattern generating device of claim 13, wherein the image translation network includes a CycleGAN (Generative Adversarial Network) capable of image-to-image translation of original images and translated images, which are unpaired with each other, respectively belonging to different domains.

\* \* \* \* \*